(12) United States Patent
Rao et al.

(10) Patent No.: US 9,240,073 B2
(45) Date of Patent: Jan. 19, 2016

(54) FILE FORMAT FOR REPRESENTING A SCENE

(75) Inventors: Arun Rao, San Ramon, CA (US); Frank Grassia, Pinole, CA (US); Michael O'Brien, Albany, CA (US); Michael Shantzis, San Francisco, CA (US); Paul Edmondson, San Francisco, CA (US)

(73) Assignee: Pixar, Emeryville, CA (US)

( * ) Notice: Subject to any disclaimer, the term of this patent is extended or adjusted under 35 U.S.C. 154(b) by 531 days.

(21) Appl. No.: 13/323,027

(22) Filed: Dec. 12, 2011

(65) Prior Publication Data

US 2013/0120422 A1    May 16, 2013

Related U.S. Application Data

(60) Provisional application No. 61/560,255, filed on Nov. 15, 2011.

(51) Int. Cl.
*G06T 17/00* (2006.01)
*G06T 13/00* (2011.01)

(52) U.S. Cl.
CPC ............... *G06T 17/00* (2013.01); *G06T 13/00* (2013.01); *G06T 2210/32* (2013.01)

(58) Field of Classification Search
CPC .... G06F 17/30; G06F 17/30091; G06T 17/00
USPC ........................................................ 707/796
See application file for complete search history.

(56) References Cited

U.S. PATENT DOCUMENTS

| | | | | |
|---|---|---|---|---|
| 5,568,595 A | * | 10/1996 | Yosefi et al. | 345/426 |
| 5,867,166 A | * | 2/1999 | Myhrvold et al. | 345/419 |
| 6,008,820 A | * | 12/1999 | Chauvin et al. | 345/502 |
| 6,009,204 A | * | 12/1999 | Ahmad | 382/236 |
| 6,404,435 B1 | * | 6/2002 | Miller et al. | 345/468 |
| 6,512,522 B1 | * | 1/2003 | Miller et al. | 345/474 |
| 7,865,529 B2 | * | 1/2011 | Kobayashi | 707/796 |
| 8,392,498 B2 | * | 3/2013 | Berg et al. | 709/202 |
| 8,583,625 B2 | * | 11/2013 | Peterson et al. | 707/713 |
| 2001/0035873 A1 | * | 11/2001 | Easter | 345/632 |
| 2003/0137506 A1 | * | 7/2003 | Efran et al. | 345/419 |
| 2004/0246526 A1 | * | 12/2004 | Ishigami et al. | 358/3.01 |
| 2005/0207733 A1 | * | 9/2005 | Gargi | 386/68 |
| 2005/0248790 A1 | * | 11/2005 | Ornstein et al. | 358/1.12 |
| 2005/0251735 A1 | * | 11/2005 | Dunietz et al. | 715/513 |
| 2005/0251740 A1 | * | 11/2005 | Shur et al. | 715/517 |
| 2005/0273701 A1 | * | 12/2005 | Emerson et al. | 715/513 |
| 2005/0278272 A1 | * | 12/2005 | Ornstein et al. | 707/1 |
| 2006/0061584 A1 | * | 3/2006 | Kristiansen | 345/582 |
| 2006/0168284 A1 | * | 7/2006 | Holthe | 709/231 |

(Continued)

*Primary Examiner* — James Trujillo
*Assistant Examiner* — Hubert Cheung
(74) *Attorney, Agent, or Firm* — Patterson + Sheridan, LLP (57) ABSTRACT

A file format that includes a constant section and a varying section. The constant section provides a referencing scheme that references the various components that comprise the scene, as well as a listing of attributes of the scene that are modifiable. Within the same file format, the varying section provides an overriding mechanism to modify the attributes that are available to be modified. Accordingly, the disclosed file format can access cached animated geometry directly and/or aggregate other files via the aforementioned referencing and sparse override semantics. This allows the same set of inspection, manipulation, and rendering tools to be used throughout the rendering pipeline, from asset creation to final rendering.

21 Claims, 7 Drawing Sheets

(56) References Cited

U.S. PATENT DOCUMENTS

2006/0274070 A1* 12/2006 Herman et al. ............... 345/474
2008/0177994 A1* 7/2008 Mayer ............................... 713/2
2012/0089669 A1* 4/2012 Berg et al. ..................... 709/203
2012/0185448 A1* 7/2012 Mensch et al. ................ 707/693
2012/0210230 A1* 8/2012 Matsuda et al. .............. 715/723
2013/0139148 A1* 5/2013 Berg et al. ..................... 717/177

* cited by examiner

FIG. 1

CONSTANT SECTION:

- GRAPH STRUCTURE
- TYPING
- REFERENCES
- DEFAULT VALUES

VARYING SECTION:

- ORGANIZED BY TIME INDEX
- OVERRIDES DEFAULT VALUES

FIG. 2

FIG. 3 a.tds 404

[ const ]

node _A : group
node _A/B : mesh
node _A/C : reference
A/C _ AssetPath _ : b.tds
A/C/ _ RefPath _ : node _ J/K
A/C/M _color _ : [ 1, 0, 0 ]

b.tds 408

[ const ]

node _J : group
node _K : mesh
node _M : object
node _N : object
node _L : mesh
J/K/M _color _ : [ 0, 1, 0 ]

COLOR
[ 1, 0, 0 ]

FILE FORMAT FOR REPRESENTING A SCENE

CROSS-REFERENCE TO RELATED APPLICATIONS

The present invention claims priority benefit to U.S. provisional patent application titled, "File Format For Representing A Scene," filed on Nov. 15, 2011 and having application Ser. No. 61/560,255, the entire contents of which are incorporated herein by reference.

BACKGROUND

1. Field of the Invention

The present invention relates to the field of computer graphics and, in particular, to a file format representing a scene.

2. Description of the Related Art

Many computer graphic images are created by mathematically modeling the interaction of light with a three-dimensional (3D) scene from a given viewpoint. This process, called rendering, generates a two-dimensional (2D) image of the scene from the given viewpoint, and is analogous to taking a photograph of a real-world scene. Animated sequences can be created by rendering a sequence of images of a scene as the scene is gradually changed over time. A great deal of effort has been devoted to making realistic-looking and artistically compelling rendered images and animations.

Computer graphics images, animations, and other productions involving computer graphics, such as interactive entertainment software, are created from a number of different components. Generally, components include any data and instructions used to create products and applications that include computer graphics. Components can include three-dimensional models of geometry, texture maps, other arrays of data, lighting, shading programs used to determine the visual appearance of models, and animation data and deformer functions used to specify changes and motion over time. One or more components are typically stored as a digital "asset." These assets can then be used to compose a rendered scene.

Digital production pipelines typically involve modeling, shading, articulation, animation, simulation, layout, lighting, and rendering. Modeling is the creation of the three-dimensional geometry of characters, sets, props, and other objects. Shading is the specification of optical attributes of the surface and interior of objects. Articulation is the specification of joints and other moveable elements of objects. Animation specifies the motion of objects over time in one or more scenes, often with reference to the objects' articulations. Simulation specifies the motion, appearance, and/or behavior of objects. Layout specifies the arrangement of objects and cameras in one or more scenes. Lighting defines the location and other attributes of light in one or more scenes. Rendering produces images or animation from the components.

During one or more of these pipeline phases, a user loads the scene and can manipulate the scene in some fashion. Using conventional techniques, all of the data that the user needs to manipulate the scene, including geometry, lighting, articulation, shading, etc. is typically loaded into memory for manipulation. Loading all of this data into memory can be a very computationally expensive task, especially when the scene is very complicated or intricate, which decreases performance.

As the foregoing illustrates, there is a need in the art for an improved technique that addresses the limitations of current approaches set forth above.

SUMMARY

One embodiments of the invention provides a method for rendering a scene. The method includes loading a portion of a first file into memory, wherein the first file is of a file type that includes a constant section and a varying section; determine an organization of components that are included in the scene and stored in a database by analyzing the constant section of the first file, wherein the constant section also includes a first attribute value of a component in the scene; generating a second file that references the first file, wherein the second file includes a second attribute value of the component in the scene; and rendering the scene based on the second attribute value of the component in the scene.

Embodiments of the invention provide a file format that includes a constant section and a varying section. The constant section provides a referencing scheme that references the various components that comprise the scene, as well as a listing of attributes of the scene that are modifiable. Within the same file format, the varying section provides an overriding mechanism to modify the attributes that are available to be modified. Accordingly, the disclosed file format can access cached animated geometry directly and/or aggregate other files via the aforementioned referencing and sparse override semantics. This allows the same set of inspection, manipulation, and rendering tools to be used throughout the rendering pipeline, from asset creation to final rendering.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

One embodiments of the invention provides a method for rendering a scene. The method includes loading a portion of a first file into memory, wherein the first file is of a file type that includes a constant section and a varying section; determine an organization of components that are included in the scene and stored in a database by analyzing the constant section of the first file, wherein the constant section also includes a first attribute value of a component in the scene; generating a second file that references the first file, wherein the second file includes a second attribute value of the component in the scene; and rendering the scene based on the second attribute value of the component in the scene.

Embodiments of the invention provide a file format that includes a constant section and a varying section. The constant section provides a referencing scheme that references the various components that comprise the scene, as well as a listing of attributes of the scene that are modifiable. Within the same file format, the varying section provides an overriding mechanism to modify one or more attributes. Accordingly, the disclosed file format can access cached animated geometry directly and/or aggregate other files via the aforementioned referencing and sparse override semantics. This allows the same set of inspection, manipulation, and rendering tools to be used throughout the rendering pipeline, from asset creation to final rendering.

Rendering Overview

As described in greater detail herein, a graphics scene is comprised of one or more components. Components may include one or more attributes containing data associated with the component. Attributes can specify any static or varying property or behavior of a component. For example, a component may be a model of a sphere. Attributes of this example component could describe properties such as the radius of the sphere and the location of the center of the sphere. Changing the value of this example component's radius attribute would change the radius of the sphere. Different types of components may include different numbers and types of attributes. The structure, arrangement, and behaviors associated with the set of attributes of a component is referred to as the semantic structure of the component. Different components may have different semantic structures, based on the type of component and its intended use.

Components can include one or more relationships that associate the component to one or more other components. Components may be related together in a hierarchy for ease of use or to specify functionality. For example, a model of a character and a model of the character's hat may be associated together for ease of use. In another example, a set of coordinate transformations may be associated together in a specific order to define a sequence for applying transformations to models. The associations, communications, and/or dependencies between two or more components may be specified by the relationships of these components.

Components are typically combined during rendering to produce an animated sequence. For example, geometric models, shading programs and data, lighting, animation data, and deformers all need to be combined correctly to produce a rendered image or scene. The associations or relationships between components can specify how the components should be combined to create a rendered image or scene.

Additionally, due to dependencies and other relationships between components, some workflow activities that create and/or modify components may need to be performed in a specific order. The activities that create and modify digital assets and their components are sometimes collectively referred to as a digital production pipeline.

Figure 1:
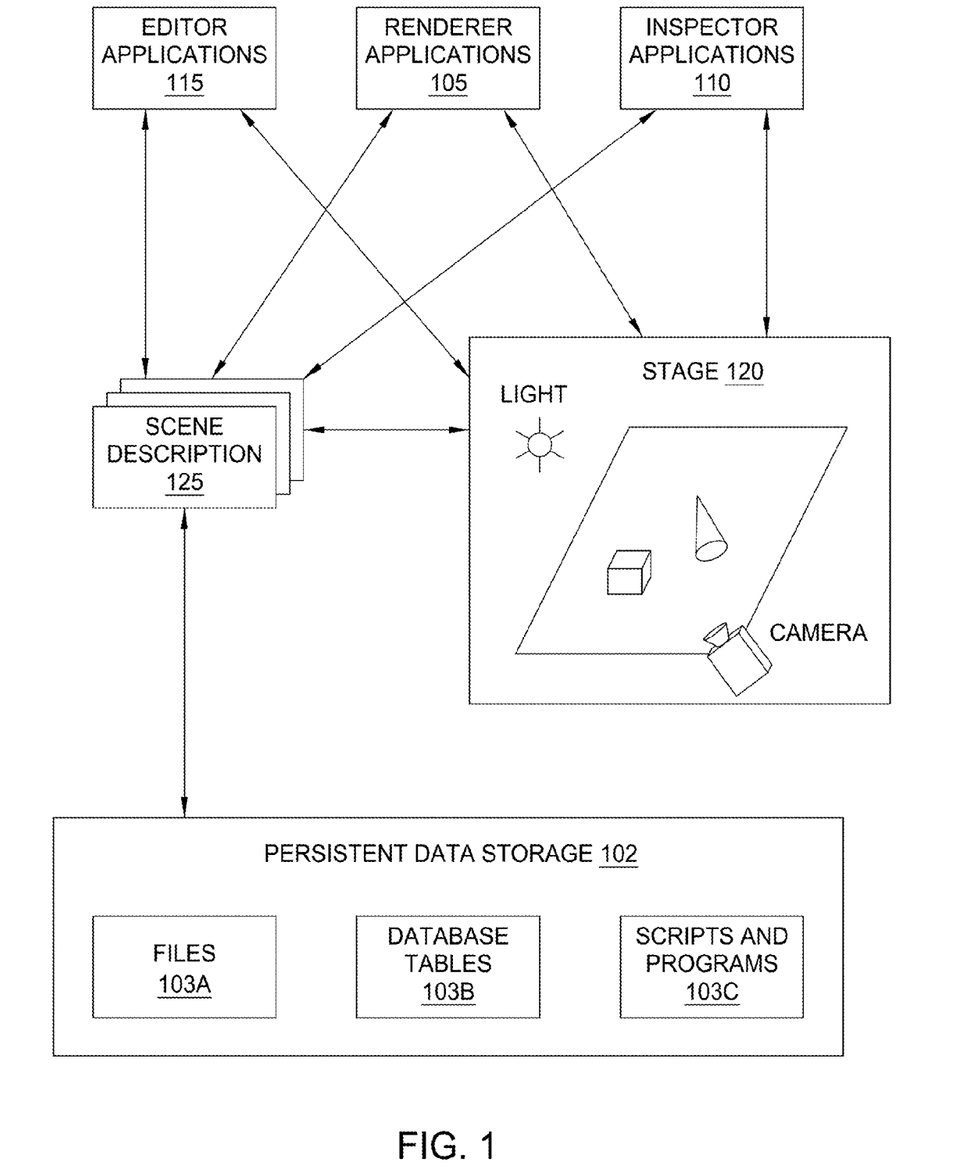
FIG. 1 illustrates a system 100 for creating, modifying, and accessing components in a digital production pipeline according to one embodiment of the invention.

FIG. 1 illustrates a system 100 for creating, modifying, and accessing components in a digital production pipeline according to one embodiment of the invention. A digital production pipeline can include a number of different activities that create, modify, combine, and process digital assets and their components to produce a final product, such as an animated sequence or an interactive software application. For large digital productions, such as in an animation or interactive digital production studio, it is often necessary for multiple people to be working on different activities of the digital production pipeline at the same time. Often, different people will be working on the same or related components at the same time. Although dependencies between components may dictate the order of activities in general, typically some activities may be performed out of order with dependencies between associated components, if any, resolved at a later time.

Often, the digital production pipeline begins with modeling activities. Modeling activities create model components representing the three-dimensional geometry of characters, sets, props, and other objects. Three-dimensional geometry can be defined using three-dimensional modeling software, two- or three-dimensional scans of physical objects, procedural modeling languages, and/or other techniques. The three-dimensional geometry of model components can be represented using any type of mathematical representation, including particles, polygons, higher order surface functions, solid geometry, volumetric data, and subdivision surfaces, among others.

Articulation activities follow the creation of a model component. For model components that will be animated, articulation activities specify how an associated object can be animated. The articulation components associated with a model component can specify the position and operation of joints. Articulation components can also be used to abstract complex motions to relatively simple control parameters, referred to as animation variables. Articulation components may include deformer functions adapted to manipulate a model component based on animation variable values. Deformer functions can perform complex manipulations of a model component in response to animation variables. For example, a single animation variable can define the degree of opening of a character model's mouth. In this example, the value of the animation variable is an input to one or more deformer functions that manipulate several different parts of a character model armature, or skeleton, and/or modify portions of the surface of the character model to create a modified character model having a mouth opened to the desired degree.

Shading activities define optical attributes of model components. Shading activities may include the specification of the color, transparency, reflectivity, and other optical attributes of the surface and/or interior of associated model components. Shading components can include texture map data of any number of dimensions, defined explicitly and/or procedurally; three-dimensional or projected painting attributes; noise data; shadow maps; normal or bump maps; and/or shader programs or procedures.

Animation activities specify the motion or animation of model components. Animation components may specify animation as changes in animation variable values and other attributes of model components over time. The articulation components are used to translate changes in animation variable and other attribute values into changes in the position, orientation, appearance, and other characteristics of the associated model components. Animation activities can specify animation variable values directly, or indirectly using algorithms such as forward or inverse kinematics, keyframes and in-betweening, and motion capture.

Similarly, simulation activities can be used to determine the appearance, animation, and/or behavior of components. Simulation techniques can be used to mimic complex real-world phenomena, such as the appearance and motion of fluids, hair, fur, and cloth. Simulation techniques can also be used for pseudo-realistic or fanciful phenomena. The components output by simulation activities are often similar to components created using animation and shading activities, and therefore can be incorporated and applied in the digital production pipeline in a similar manner.

Layout activities arrange components such as models, articulation, shading, and animation together in one or more scenes or shots. Layout activities can also include the specification of one or more cameras, each representing a desired rendering viewpoint, for each scene. The layout of each scene may be specified by a component incorporating or referencing other components or by a portion of the attribute values of the components of the scene.

Lighting activities specify the location and attributes of one or more light sources in a scene. Light sources are components that specify the amount, direction, and type of light falling on one or more model components in a scene. The location and attributes of light source components can change over time through an association with an animation component.

Rendering activities convert layout components and associated model, articulation, shading, animation, simulation, lighting, and other components into one or more images representing a scene from a desired rendering viewpoint. Rendering activities can use any rendering techniques or combination of techniques known in the art, including rasterization, scanline rendering techniques, image based rendering techniques, global illumination, radiosity, and ray tracing. Rendering can be done at interactive frame rates or offline.

For non-interactive products, the output of the renderer can be composited, edited, mixed with audio, and otherwise processed to create the finished movie. Animated sequences from two or more cameras positioned within a scene or from multiple scenes together can be combined to form a finished sequence. Editing information can be represented in the form of components such as edit decision lists that indicate the location, length, and sequence of animation sequences to be combined. For interactive productions, the finished product can include digital assets containing all the required components, a renderer, and control logic responsive to user input. User input is processed by the control logic to manipulate the state of components. The renderer then processes the components to provide an interactive presentation to the user.

System 100 includes a number of applications for creating, viewing, modifying, and processing digital assets and their components. Examples of these applications include renderer applications 105, inspector applications 110, and editor applications 115. Renderer applications 105 are adapted to process components to create one or more images. Renderer applications 105 can utilize any rendering techniques or combinations of techniques known in the art, including ray casting and ray tracing, scanline rendering, rasterization, and image based rendering. Renderer applications 105 can produce images at interactive frame rates or at substantially slower rates depending upon the rendering technique, the available computing resources, and the desired degree of visual detail. Renderer applications 105 can also edit and combine sequences of animation.

Inspector applications 110 are adapted to present users with the state of one or more components. The state of components can include the values of one or more attributes. Attributes can define all aspects of a component, including whether the component itself is active, or is present, in a scene. Additionally, the state of components can change over time within an animated sequence and at different points in the digital production pipeline. Inspector applications 110 can present state information of components in a number of different formats, including in the form of text, tables, timelines, charts, graphs, images, and renderings from one or more viewpoints.

Editor applications 115 are adapted to create and modify the state of one or more components. Editor applications 115 can utilize interfaces adapted to manipulate data in the form of text, tables, timelines, charts, graphs, images, and renderings from one or more viewpoints to create components and modify their attributes. Additionally, a user can input attribute values directly using any type or combination of input devices well known in the art, including keyboards, mice, and digitizer tablets. Additionally, editor applications 110 can analyze user input to indirectly set or modify one or more attribute values. For example, a user input could be processed by a filtering algorithm in an editor application to modify several attributes simultaneously in varying amounts.

Example applications 105, 110, 115 can be combined into a single hybrid application that perform each of the inspector, editor, and/or renderer functions. In an embodiment, system 100 includes an application programming interface enabling any additional applications to access and modify components.

Digital production pipeline applications, such as example applications 105, 110, 115, can store and retrieve components in digital assets, such a files 103A, database tables 103B, and scripts and programs 103C. The digital production pipeline applications can create new digital assets to hold one or more components, modify existing digital assets to add, remove, or modify components, remove unneeded digital assets, and encapsulate one or more digital assets in another digital asset. Digital assets 103A, 103B, and 103C are stored by persistent data store 102, which can be comprised of data storage devices of any type, including a relational database.

In an embodiment, system 100 includes a stage 120. The stage 120 includes an instantiation of the complete state of one or more components for at least one scene. This can include a component such as a model, a light, or a camera; articulation and animation data; a supporting component such as a texture map or a shader; or any combination of components. As discussed below, the stage 120 instantiates the complete state of one or more components for one or more scenes at any point in the digital production pipeline. Components may take on different states, or augment their initial state with additional attributes, at different points of the digital production pipeline. Applications 105, 110, 115 can create, access, and modify the state of components for one or more scenes via stage 120.

To maintain state information for components for one or more scenes at any arbitrary point of the digital production pipeline, an embodiment of the system 100 represents components as a unified scene description 125. For each component, the unified scene description 125 includes at least one opinion of the value of each of its attributes for one or more scenes, with the exception of any application-supplied or default values. To determine the state of a component for one or more scenes at a given point of the digital production pipeline, the system 100 processes the unified scene description 125 to identify the most appropriate opinions of attribute values for the given point. The system 100 reconstructs or instantiates the component in the stage 120 using the complete set of opinions of attribute values associated with the given point (as well as any application-supplied or default values, if necessary).

As described in greater detail herein, embodiments of the invention provide a file format that represents a scene graph that describes the scene. One goal of the disclosed file format is to allow animated scenes to be written to and read from persistent data storage 102, such that when they are read from the persistent data storage 102, the memory footprint is much less than that using prior art techniques. In some embodiments, the state of the scene at any time is determined by composing the data stored at that time sample and a constant (i.e., "const") header section of the file format. By contrast, in prior approaches, each frame is completely independent. In some embodiments, the data stored at each time index in the file format is random access, meaning that a single time sample may be read in generally constant time, regardless of where in the file the time sample occurs. As described below, in embodiments of the invention, the disclosed file format is both a file format/schema for encoding scene graphs, as well as an API (Application Programming Interface) for authoring, serializing, deserializing, and traversing such scene graphs.

File Format for Representing a Scene

One aspect of embodiments of the invention is to facilitate representing and rendering large amounts of animated geometry. To achieve this goal, embodiments of the invention provide an animation caching technique that incorporates referencing, layering, and sparse overrides in a single file format. Also, in some embodiments, the cached animation may include procedurally-generated geometry.

In one embodiment, the file format is implemented via scene and node subclasses that define a transformation hierarchy that has a low memory footprint. For example, nothing but the structure of the scene graph is retained in memory, as described in greater detail below. When traversing the scene graph, embodiments of the invention perform no additional caching of data. Therefore, each attribute query is passed to the persistent data storage 102, which reduces the memory footprint of traversing and/or rendering the scene.

Another aspect of embodiments of the invention is the separation of (i) representation of the scene from (ii) rendering the scene. Certain behaviors are built into the file format, such as the semantics of attribute resolution and interpolation and the ability to discern object hierarchy, but a majority and/or all the data associated with each object remains on disk.

To enable the development of richer and modular behaviors, embodiments of the invention allow users to modify the attributes of a scene or objects within the scene by adding an overriding scene that references the original. In some embodiments, not all of the attributes are modifiable by a particular user, and only a subset of the attributes is modifiable. The subset of attributes that are modifiable are listed in a "table of contents" portion of the constant section of the file format. In one embodiment, the attributes listed the table of contents portion represent the attributes that are "intended" to be modified, but all of the attributes (even those not listed in the table of contents portion) are still modifiable. A file is thus a "gray box," meaning that users that desire to modify the scene may do so, but otherwise the file is treated as a "black box" that is not modified.

One embodiment of the invention stores digital assets, components, and their attributes, referred to generically as "scene description," directly in a database. In one embodiment, the database is a key-value pair database. Examples of key-value pair databases include, but are not limited to, Oracle Berkeley DB, SQLite, Kyoto Cabinet, and leveldb (by Google), among others. Digital production software applications perform database queries to retrieve any required assets, components, and attributes from the database. As described, prior art approaches to digital production software applications instantiate components "in memory" from the results of database queries for viewing, editing, rendering, or any other type of operation.

The process of editing often includes imparting animation to some components of the scene. Expensive computations are then performed to determine the values of the attributes of these components at each frame. These values can either be cached in memory or recomputed. The former approach may result in excessive memory usage, and the latter may be too slow. Embodiments of the invention provide a digital software application with an efficient way to cache animated values on disk.

The ultimate objective of most scene graphs is to render an image and deal in a rich set of standard attributes and inheritance and/or override semantics for those attributes. However, the disclosed file format explicitly separates representation from behaviors (such as rendering), and therefore provides only a limited number of defined standard attributes and semantics, preferring to leave many typical scene graph attributes (such as, for example, shading) to users to define and implement inheritance semantics using a rendering application.

Figure 2:
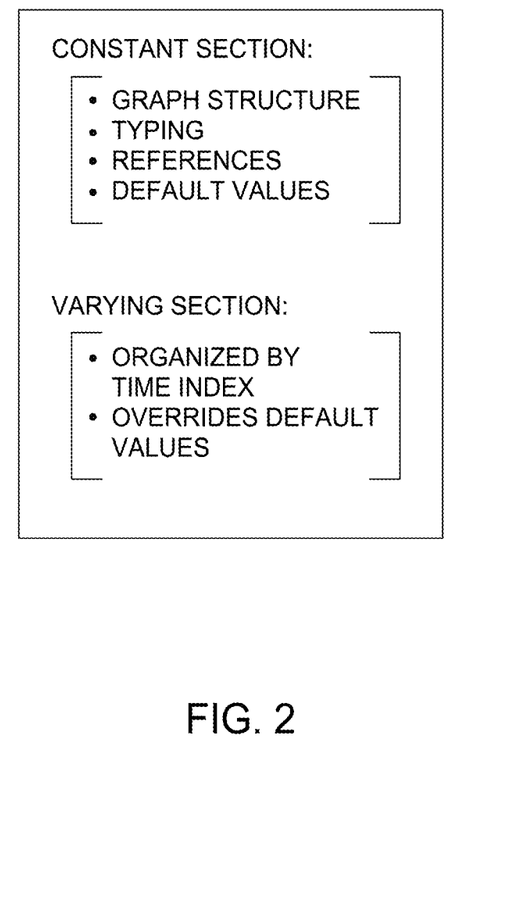
FIG. 2 is a conceptual diagram depicting a structure of the file format, according to one embodiment of the invention.

FIG. 2 is a conceptual diagram depicting a structure of the file format, according to one embodiment of the invention. As shown, the file includes two sections, a constant (or "const") section and a varying section. The constant section provides a definition of the scene description structure and other time-invariant data. In some embodiments, the scene description structure is hierarchical. The constant section also provides a "type" for each node in the graph structure. For instance, a node may have a geometry type, such as "mesh," where the polygon mesh of an object maintains a fixed topology for the entire animation. In such cases, the file format stores the topology once, in the unvarying, constant section, rather than at the N time-samples that contain poses of the vertices of the mesh.

Also, the constant section includes references to other files and, in some cases, to the nodes in the other files. In some embodiments, the references themselves may be animated. In other words, the file from which we read data may change from frame to frame. The constant section also provides a listing of the attributes that are modifiable by a user and default values for those attributes. The attribute values can have any form, including floating-point numbers, arrays of floating-point numbers, binary numbers, strings, or any other value format. Nodes have two kinds of attributes: those that are inherent to a node type, such as the vertices of a mesh node, and those that are arbitrarily-named and typed for some client-specific purpose.

As also shown, the file format includes a varying section. The varying section is organized by time index, e.g., by frame number. Attribute values may be specified at arbitrary frame values, in which case the constant section value for that attribute (if any) is ignored, and values for any frame value is computed by interpolating appropriately.

Figure 3:
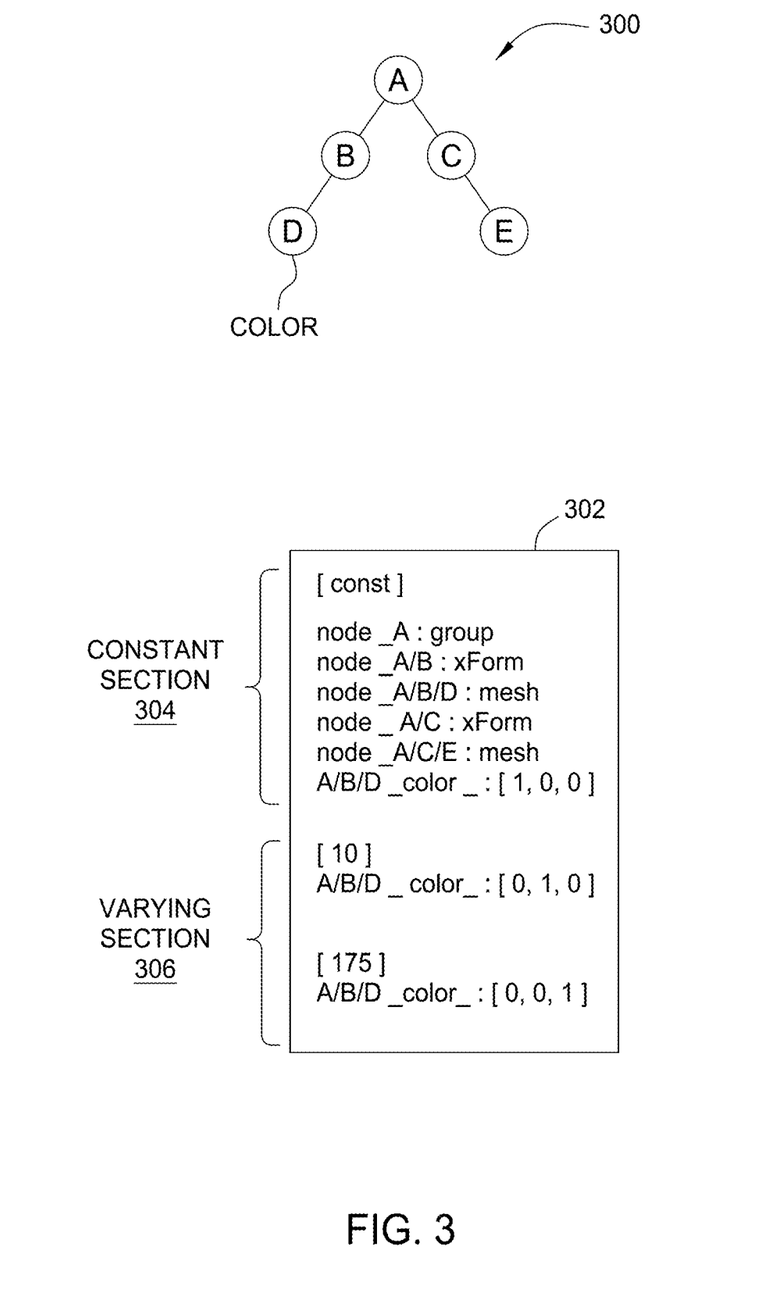
FIG. 3 is a conceptual diagram depicting an example of a file and a corresponding graph structure using the disclosed file format, according to one embodiment of the invention.

FIG. 3 is a conceptual diagram depicting an example of a file and a corresponding graph structure using the disclosed file format, according to one embodiment of the invention. As shown, a file 302 includes a constant section 304 and a varying section 306. The constant section 304 provides the graph structure, type information for each node, as well as a default value for one attribute in the example shown. All, some, or none of the attributes present in a scene may be listed in the table of contents portion of the constant section. Any of the attributes may be edited, not just those listed in the table of contents portion. However, the table of contents portion lists those attributes that are intended for editing by the authoring application. This table of contents describes the attributes (e.g., their default values, minimum and maximum values, etc.) and provides an editing application a quick way of discovering the attributes and, for example, constructing a user interface for them. In some embodiments, less than all of the attributes of a scene are listed in the table of contents portion of the constant section 304. Graph 300 shows the graph structure defined by this example file.

The file 300 also includes the varying section 306. The varying section 306 is organized by time index and provides changes to the attribute values at those time indices. As shown in the constant section 304 the color of node D (represented as "A/B/D" in the referencing schema) has a default value of [1,0,0], which corresponds to "red," where colors are defined by the scheme [x,y,z], where x is red, y is green, and z is blue. As shown in the varying section 306, at frame [10], the color of node D is set to "green," and at frame [175] the color of node D is set to "blue." In some embodiments, interpolation is a core service provided by the library. Some attributes, such as color, can be automatically interpolated unless the client application explicitly desires otherwise.

One aspect of embodiments of the invention is the ability to use the disclosed file format to have one file reference another file. In other words, a node in a particular scene may be authored as a reference to a sub-graph within another scene or file. Importantly, a scene created in this manner is indistinguishable from a scene in which all the data in the referenced scenes are in a single file (i.e., the graph itself is in memory, whether or not referencing is present). In some embodiments, conflicts may exist between attribute values for a particular component; therefore, attribute resolution semantics are configured to proceed from the outermost (i.e., "strongest opinion") scene to the innermost (i.e., "weakest opinion") scene. An example is provided in FIG. 4.

Figure 4:
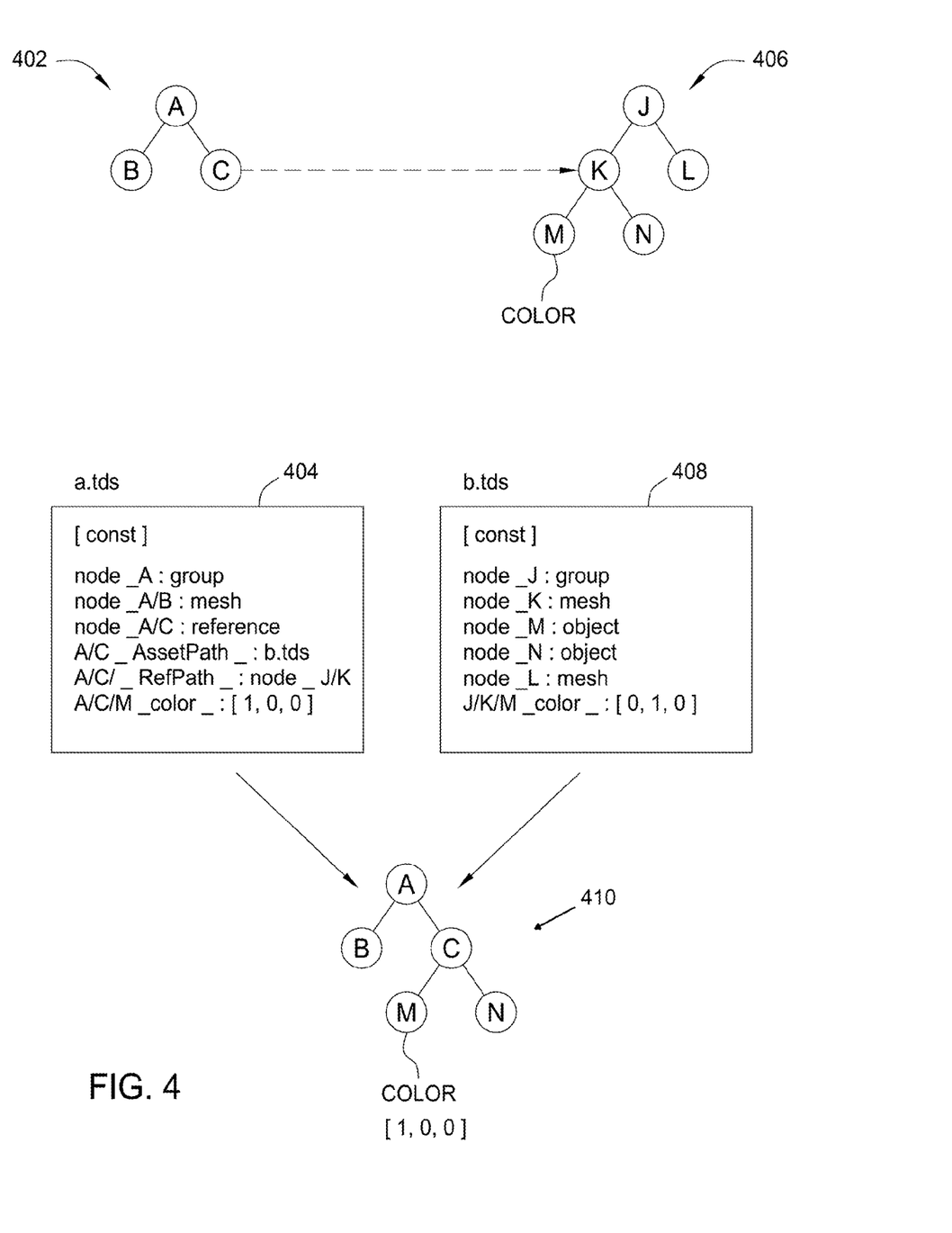
FIG. 4 shows an example of first file that has an internal reference to a second file, according to one embodiment of the invention.

FIG. 4 shows an example of first file that has an internal reference to a second file, according to one embodiment of the invention. A file 404 (i.e., "a.tds") defines graph structure 402. Node A is the root node (having type "group") and has nodes B and C as children. Node B is a mesh. Node C is a reference to node K in a second file 408 (i.e., "b.tds"). The second file 408 defines graph structure 406.

Node C in file 404 is a reference to node K in the second file 408. The resultant graph structure is shown as graph structure 410. As shown, file 404 defines a color for node M as [1,0,0]. The second file 408 also defines a color for node M, but as [0,1,0]. When determining what color to apply to node M, the rendering application may select the outermost attribute value, i.e., the attribute value associated with file 404, which has the highest priority among the files that define a color for node M. In this example, the color value of node M would be [1,0,0].

In sum, embodiments of the invention provide a file format that includes a constant section and a varying section. The constant section provides a referencing scheme that references the various components that comprise the scene, as well as a listing of attributes of the scene that are intended to be modifiable. Within the same file format, the varying section provides an overriding mechanism to modify the attributes that are available to be modified. Accordingly, the disclosed file format can access cached animated geometry directly and/or aggregate other files via the aforementioned referencing and sparse override semantics. This allows the same set of inspection, manipulation, and rendering tools to be used throughout the rendering pipeline, from asset creation to final rendering.

Figure 5:
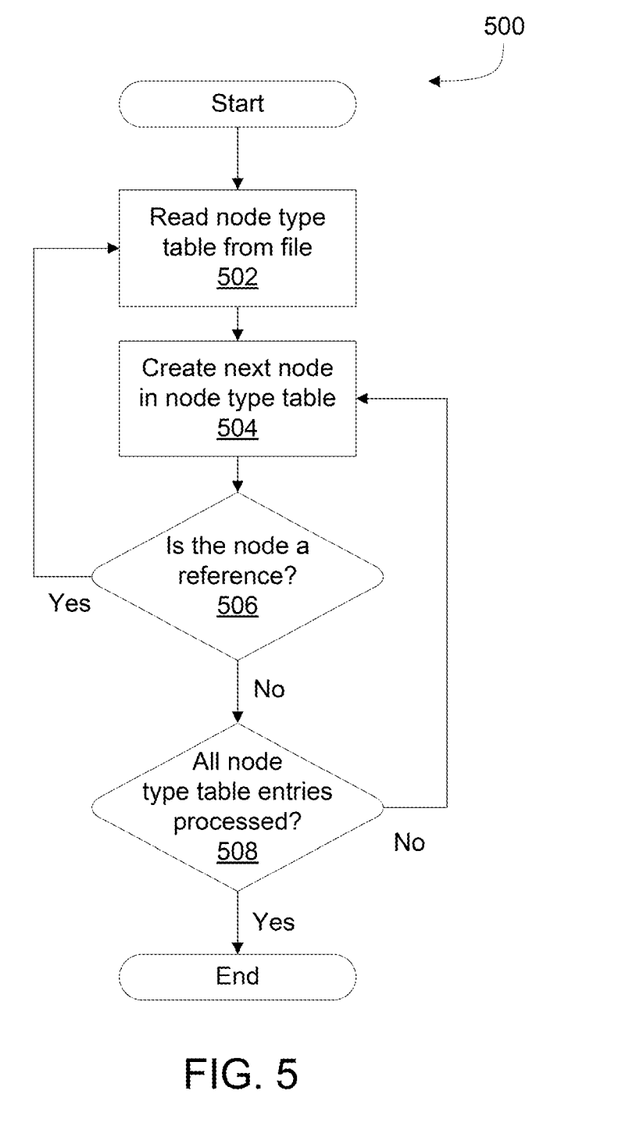
FIG. 5 is a flow diagram of method steps for constructing a graph using the disclosed file format, according to one embodiment of the invention.

FIG. 5 is a flow diagram of method steps for constructing a graph using the disclosed file format, according to one embodiment of the invention. Persons skilled in the art will understand that, even though the method 500 is described in conjunction with the systems of FIGS. 1-4 and 7, any system configured to perform the method steps, in any order, is within the scope of embodiments of the invention.

As shown, the method 500 begins at step 502, where a software application, such as a rendering application executed by a processor, reads a node type table from a file. In one embodiment, the node type table is loaded into memory. As described, the disclosed file format includes a constant section and a varying section. Within the constant section, the file format may include a node type table as well as a listing of one or more attributes.

At step 504, the software application creates a next node in a table based on the type of the node included in the node type table. At step 506, the software application determines whether the node is a reference to another node. If the node is a reference to another node, then the method 500 returns to step 502, described above. In this manner, the method 500 recursively determines the graph structure of the scene by following the references to other nodes. At step 506, if the node is not a reference to another node, then the method 500 proceeds to step 508.

At step 508, the software application determines whether all entries in the node type table have been processed. If not, then the method returns to step 504, described above. If the software application determines that all the node type table entries are processed, then the method 500 terminates.

Figure 6:
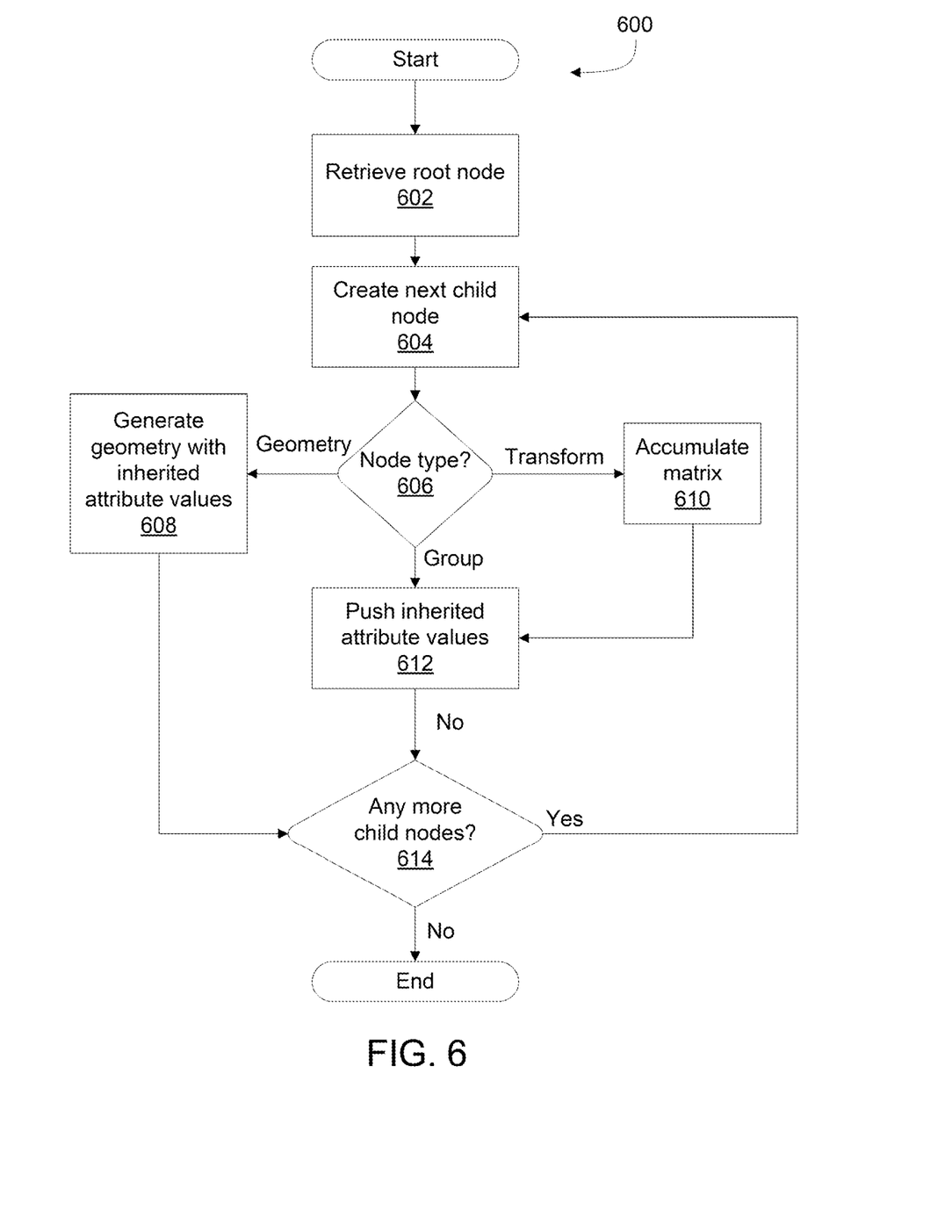
FIG. 6 is a flow diagram of method steps for graph traversal and rendering using the disclosed file format, according to one embodiment of the invention.

FIG. 6 is a flow diagram of method steps for graph traversal and rendering using the disclosed file format, according to one embodiment of the invention. Persons skilled in the art will understand that, even though the method 600 is described in conjunction with the systems of FIGS. 1-4 and 7, any system configured to perform the method steps, in any order, is within the scope of embodiments of the invention.

As shown, the method 600 begins at step 602, where a software application, such as a rendering application executed by a processor, retrieves a root node. At step 604, the software application examines the root node to retrieve the next child node referenced by the root node. The child node may be associated with a matrix of attributes.

At step 606, the software application examines the node type of the child node to determine whether the child node refers to geometry, a transformation operator, or a group. If the node type refers to geometry, the method 600 proceeds to step 608, where the software application generates the geometry. The geometry is generated with values for attributes taken from the matrix of attributes associated with the node.

If, at step 606, the node type refers to a group, then the method 600 proceeds to step 612. At step 612, the software application pushes the inherited attributes of the current node down to the other nodes in the group. An example of a "group" node is shown in FIG. 3 where node A is "group" node that references child nodes B and C.

If, at step 606, the node type refers to a transformation operation, the method 600 proceeds to step 610, where the software accumulates a matrix of attributes associated with the transformation operation. In some embodiments, accumulating the matrix of attributes comprises modifying the current attribute values in the matrix based on the transformation operation. The method then proceeds to step 612, described above.

At step 614, the software application determines whether there are any more child nodes to process. If not, then the method 600 terminates. If there are more child nodes to process, then the method 600 returns to step 604, described above. Eventually, the entire graph structure is traversed using the looping mechanism described in FIG. 6. Transformations made to attribute values at particular node in the graphs structure are accumulated in a matrix and passed down to the next node. Eventually, the graph structure traversal reaches a geometry node that is generated using the matrix with accumulated attribute values. In some embodiments, the amount of data required to represent the geometry in a scene is too large. For example, it may not be feasible to store all the blades of grass in a meadow directly in a single file. In such cases, the geometry can be procedurally generated, meaning that a piece of application code can be executed at render time that creates the geometry as needed.

To implement supporting procedurally-generated geometry, embodiments of the invention provide a node in the disclosed file format that carries the name of a procedural program to be executed. The rendering application is aware of this node as a "procedural" node and is capable of invoking the specified procedural program at render time to generate the geometry.

As an example use case, in some embodiments, the disclosed file format can be used to provide a sparse override on a cache. As described above, an animation pipeline may include various stages. At each stage, some portion of the scene is modified or manipulated. Embodiments of the invention provide a file format that allows a first stage to manipulate some subset of data in a scene and cache that portion of the scene, while leaving the remainder of scene to be fully modifiable. For example, a particular stage could cache just the mesh points in a scene, but all of the other data (such as shading data or lighting or animation data) is not cached. At subsequent stages of the animation pipeline, other portions of the scene can further be cached. Importantly, the data cached in the first stage, although not intended to modified in subsequent stages, can still be modified if so desired. Accordingly, embodiments of the invention provide the increased performance of a cache along with the flexibility and editability of a non-cached, in-memory approach.

Advantageously, the disclosed file format provides for economy of storage when rendering since the geometric data for components of the scene remains stored in persistent storage and is not loaded into memory. Also, embodiments of the invention provide for significantly lower network bandwidth usage. This advantage stems from the observation that the volume of animated data is small compared to the static data defining the scene (i.e., geometry, shading, etc.).

Hardware Overview

Figure 7:
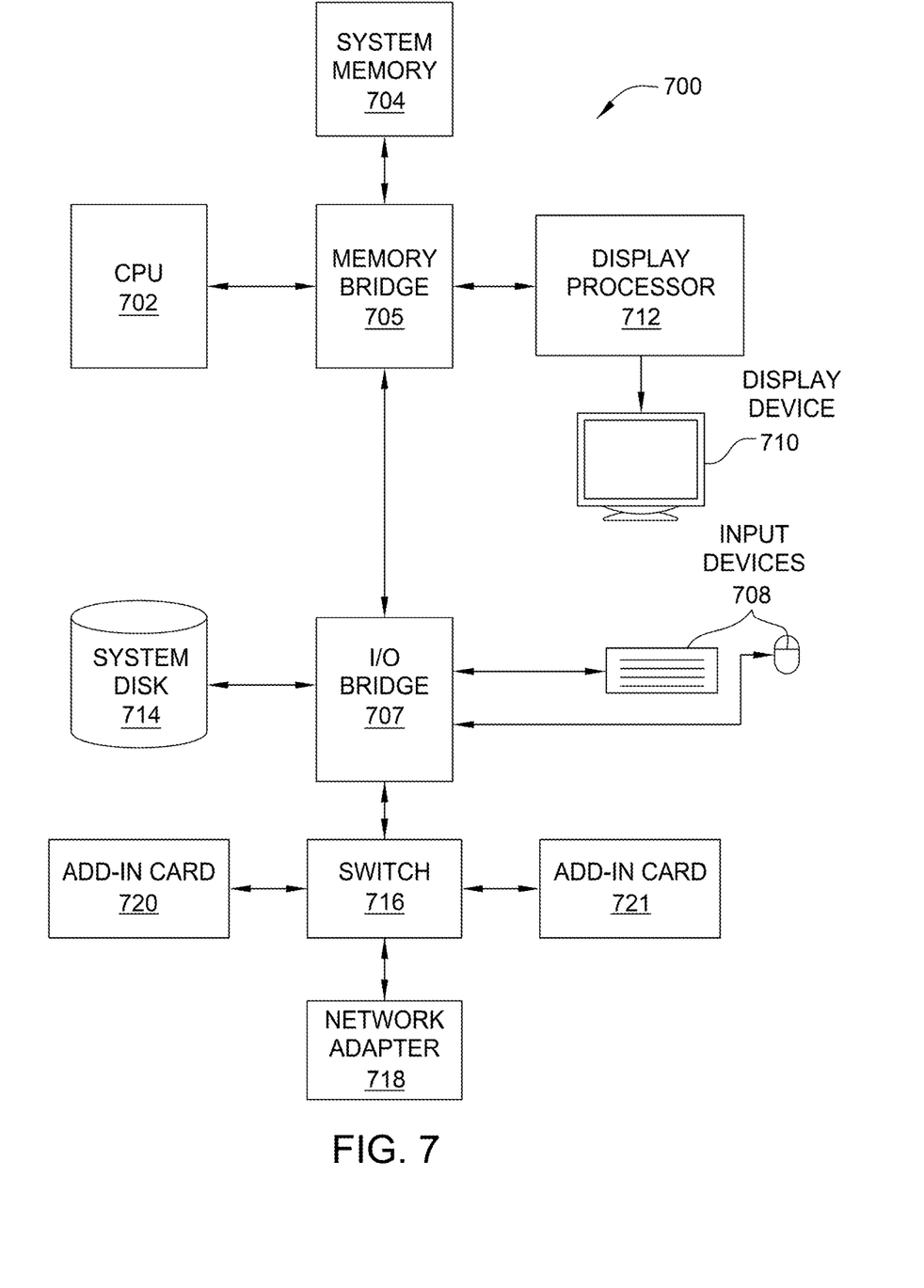
FIG. 7 is a block diagram of a system configured to implement one or more aspects of the invention.

FIG. 7 depicts one architecture of a system 700 within which embodiments of the present invention may be implemented. This figure in no way limits or is intended to limit the scope of the present invention. System 700 may be a personal computer, video game console, personal digital assistant, rendering engine, or any other device suitable for practicing one or more embodiments of the present invention.

As shown, system 700 includes a central processing unit (CPU) 702 and a system memory 704 communicating via a bus path that may include a memory bridge 705. CPU 702 includes one or more processing cores, and, in operation, CPU 702 is the master processor of system 700, controlling and coordinating operations of other system components. System memory 704 stores software applications and data for use by CPU 702. CPU 702 runs software applications and optionally an operating system. Memory bridge 705, which may be, e.g., a Northbridge chip, is connected via a bus or other communication path (e.g., a HyperTransport link) to an I/O (input/output) bridge 707. I/O bridge 707, which may be, e.g., a Southbridge chip, receives user input from one or more user input devices 708 (e.g., keyboard, mouse, joystick, digitizer tablets, touch pads, touch screens, still or video cameras, motion sensors, and/or microphones) and forwards the input to CPU 702 via memory bridge 705.

A display processor 712 is coupled to memory bridge 705 via a bus or other communication path (e.g., a PCI Express, Accelerated Graphics Port, or HyperTransport link); in one embodiment display processor 712 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 704.

Display processor 712 periodically delivers pixels to a display device 710 (e.g., a screen or conventional CRT, plasma, OLED, SED or LCD based monitor or television). Additionally, display processor 712 may output pixels to film recorders adapted to reproduce computer generated images on photographic film. Display processor 712 can provide display device 710 with an analog or digital signal.

A system disk 714 is also connected to I/O bridge 707 and may be configured to store content and applications and data for use by CPU 702 and display processor 712. System disk 714 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 716 provides connections between I/O bridge 707 and other components such as a network adapter 718 and various add-in cards 720 and 721. Network adapter 718 allows system 700 to communicate with other systems via an electronic communications network, and may include wired or wireless communication over local area networks and wide area networks such as the Internet.

Other components (not shown), including USB or other port connections, film recording devices, and the like, may also be connected to I/O bridge 707. For example, an audio processor may be used to generate analog or digital audio output from instructions and/or data provided by CPU 702, system memory 704, or system disk 714. Communication paths interconnecting the various components in FIG. 7 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 712 incorporates circuitry optimized for graphics and video processing, including, for example, video output circuitry, and constitutes a graphics processing unit (GPU). In another embodiment, display processor 712 incorporates circuitry optimized for general purpose processing. In yet another embodiment, display processor 712 may be integrated with one or more other system elements, such as the memory bridge 705, CPU 702, and I/O bridge 707 to form a system on chip (SoC). In still further embodiments, display processor 712 is omitted and software executed by CPU 702 performs the functions of display processor 712.

Pixel data can be provided to display processor 712 directly from CPU 702. In some embodiments of the present invention, instructions and/or data representing a scene are provided to a render farm or a set of server computers, each similar to system 700, via network adapter 718 or system disk 714. The render farm generates one or more rendered images of the scene using the provided instructions and/or data. These rendered images may be stored on computer-readable media in a digital format and optionally returned to system 700 for display. Similarly, stereo image pairs processed by display processor 712 may be output to other systems for display, stored in system disk 714, or stored on computer-readable media in a digital format.

Alternatively, CPU 702 provides display processor 712 with data and/or instructions defining the desired output images, from which display processor 712 generates the pixel data of one or more output images, including characterizing and/or adjusting the offset between stereo image pairs. The data and/or instructions defining the desired output images can be stored in system memory 704 or graphics memory within display processor 712. In an embodiment, display processor 712 includes 3D rendering capabilities for generating pixel data for output images from instructions and data defining the geometry, lighting shading, texturing, motion, and/or camera parameters for a scene. Display processor 712 can further include one or more programmable execution units capable of executing shader programs, tone mapping programs, and the like.

CPU 702, render farm, and/or display processor 712 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 704 is connected to CPU 702 directly rather than through a bridge, and other devices communicate with system memory 704 via memory bridge 705 and CPU 702. In other alternative topologies display processor 712 is connected to I/O bridge 707 or directly to CPU 702, rather than to memory bridge 705. In still other embodiments, I/O bridge 707 and memory bridge 705 might be integrated into a single chip. The particular components shown herein are optional; for instance, any number of add-in cards or peripheral devices might be supported. In some embodiments, switch 716 is eliminated, and network adapter 718 and add-in cards 720, 721 connect directly to I/O bridge 707.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for rendering a three-dimensional scene, the method comprising:
loading, into memory, a portion of a first file of a file type, wherein the first file describes graphical elements within the three-dimensional scene, wherein the first file includes a constant section describing an organization of the graphical elements and a varying section describing attributes of the graphical elements with respect to time, wherein the constant section defines (i) a hierarchical graph structure comprising a plurality of nodes, wherein each of the plurality of nodes represents a respective graphical element within the three-dimensional scene and (ii) a plurality of default values each corresponding to a respective one of the plurality of nodes of the hierarchical graph structure, and wherein the varying section defines one or more override values corresponding to one or more of the plurality of default values at a specified moment in time;
generating a second file, of the file type, that references a first one of the nodes of the hierarchical graph structure included in the first file, wherein the first node corresponds to a first graphical element in the three-dimensional scene, and wherein the second file includes a second attribute value for the first graphical element that overrides at least one of the plurality of default values of the first file; and
rendering the three-dimensional scene based on both the at least one node of the first file referenced in the second file and the second attribute value of the component in the three-dimensional scene.

2. The computer-implemented method of claim 1, wherein the determining the organization of components further comprises resolving references to other files having the file type.

3. The computer-implemented method of claim 1, wherein the first file is loaded into the memory from a key-value pair database.

4. The computer-implemented method of claim 1, wherein the rendering the scene comprises choosing an attribute value for a component based on selecting the attribute value for the component in a file having the highest priority.

5. The computer-implemented method of claim 4, wherein the second file has greater priority than the first file.

6. The computer-implemented method of claim 4, wherein the attribute value for a component is chosen based on selecting the attribute value for the component in a file other than the file with the highest priority when the file with the highest priority does not include an attribute value for the component.

7. The computer-implemented method of claim 1, wherein at least one of the components included in the scene is procedurally generated based on executing application code that creates geometry associated with the component.

8. A non-transitory computer-readable medium storing instructions that, when executed by a processor, cause the processor to render a three-dimensional scene, by performing an operation comprising:

loading, into memory, a portion of a first file of a file type, wherein the first file describes graphical elements within the three-dimensional scene, wherein the first file includes a constant section describing an organization of the graphical elements and a varying section describing attributes of the graphical elements with respect to time, wherein the constant section defines (i) a hierarchical graph structure comprising a plurality of nodes, wherein each of the plurality of nodes represents a respective graphical element within the three-dimensional scene and (ii) a plurality of default values each corresponding to a respective one of the plurality of nodes of the hierarchical graph structure, and wherein the varying section defines one or more override values corresponding to one or more of the plurality of default values at a specified moment in time;

generating a second file, of the file type, that references a first one of the nodes of the hierarchical graph structure included in the first file, wherein the first node corresponds to a first graphical element in the three-dimensional scene, and wherein the second file includes a second attribute value for the first graphical element that overrides at least one of the plurality of default values of the first file; and rendering the three-dimensional scene based on both the at least one node of the first file referenced in the second file and the second attribute value of the component in the three-dimensional scene.

9. The non-transitory computer-readable medium of claim 8, wherein the determining the organization of components further comprises resolving references to other files having the file type.

10. The non-transitory computer-readable medium of claim 8, wherein the first file is loaded into the memory from a key-value pair database.

11. The non-transitory computer-readable medium of claim 8, wherein the rendering the scene comprises choosing an attribute value for a component based on selecting the attribute value for the component in a file having the highest priority.

12. The non-transitory computer-readable medium of claim 11, wherein the second file has greater priority than the first file.

13. The non-transitory computer-readable medium of claim 11, wherein the attribute value for a component is chosen based on selecting the attribute value for the component in a file other than the file with the highest priority when the file with the highest priority does not include an attribute value for the component.

14. The non-transitory computer-readable medium of claim 8, wherein at least one of the components included in the scene is procedurally generated based on executing application code that creates geometry associated with the component.

15. A computer system, comprising:
a processor; and
a memory storing instructions that, when executed by the processor, cause the processor to render a three-dimensional scene by performing an operation, comprising:

loading, into memory, a portion of a first file of a file type, wherein the first file describes graphical elements within the three-dimensional scene, wherein the first file includes a constant section describing an organization of the graphical elements and a varying section describing attributes of the graphical elements with respect to time, wherein the constant section defines (i) a hierarchical graph structure comprising a plurality of nodes, wherein each of the plurality of nodes represents a respective graphical element within the three-dimensional scene and (ii) a plurality of default values each corresponding to a respective one of the plurality of nodes of the hierarchical graph structure, and wherein the varying section defines one or more override values corresponding to one or more of the plurality of default values at a specified moment in time;

generating a second file, of the file type, that references a first one of the nodes of the hierarchical graph structure included in the first file, wherein the first node corresponds to a first graphical element in the three-dimensional scene, and wherein the second file includes a second attribute value for the first graphical element that overrides at least one of the plurality of default values of the first file; and rendering the three-dimensional scene based on both the at least one node of the first file referenced in the second file and the second attribute value of the component in the three-dimensional scene.

16. The computer system of claim 15, wherein the determining the organization of components further comprises resolving references to other files having the file type.

17. The computer system of claim 15, wherein the first file is loaded into the memory from a key-value pair database.

18. The computer system of claim 15, wherein the rendering the scene comprises choosing an attribute value for a component based on selecting the attribute value for the component in a file having the highest priority.

19. The computer system of claim 18, wherein the second file has greater priority than the first file.

20. The computer system of claim 18, wherein the attribute value for a component is chosen based on selecting the attribute value for the component in a file other than the file with the highest priority when the file with the highest priority does not include an attribute value for the component.

21. The computer system of claim 15, wherein at least one of the components included in the scene is procedurally generated based on executing application code that creates geometry associated with the component.

* * * * *